(12) United States Patent
Miao et al.

(10) Patent No.: US 8,199,718 B2
(45) Date of Patent: Jun. 12, 2012

(54) APPARATUS AND METHOD FOR SPLICING MULTIMEDIA SESSION ON COMMUNICATION NETWORKS

(75) Inventors: Yu-Ben Miao, Tainan (TW); Wei-Hung Chen, Taipei (TW); Ce-Kuen Shieh, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 629 days.

(21) Appl. No.: 12/395,652

(22) Filed: Feb. 28, 2009

(65) Prior Publication Data
US 2010/0150105 A1 Jun. 17, 2010

(30) Foreign Application Priority Data
Dec. 11, 2008 (TW) .............................. 97148220 A

(51) Int. Cl.
*G06F 15/18* (2006.01)
(52) U.S. Cl. ......... 370/331; 370/469; 455/436; 455/439
(58) Field of Classification Search .................. 370/331, 370/400, 469; 455/436, 437, 438, 439
See application file for complete search history.

(56) References Cited

U.S. PATENT DOCUMENTS

| | | | | |
|---|---|---|---|---|
| 6,199,107 B1* | 3/2001 | Dujari | .......................... | 709/219 |
| 2003/0061369 A1* | 3/2003 | Aksu et al. | .................... | 709/231 |
| 2003/0088765 A1* | 5/2003 | Eschbach et al. | ............. | 713/150 |
| 2003/0188182 A1* | 10/2003 | Sato et al. | .................... | 713/193 |
| 2003/0221014 A1* | 11/2003 | Kosiba et al. | ................. | 709/231 |
| 2005/0102371 A1* | 5/2005 | Aksu | .............................. | 709/217 |
| 2007/0030826 A1* | 2/2007 | Zhang et al. | .................. | 370/331 |
| 2007/0165572 A1* | 7/2007 | Lenzarini | ...................... | 370/331 |
| 2007/0171895 A1 | 7/2007 | Oberle et al. | | |
| 2007/0234048 A1* | 10/2007 | Ziv | ................................ | 713/159 |
| 2008/0183645 A1* | 7/2008 | Burger et al. | .................. | 706/12 |
| 2008/0256431 A1* | 10/2008 | Hornberger | ................... | 715/202 |

(Continued)

FOREIGN PATENT DOCUMENTS
WO 0131472 A1 5/2001

OTHER PUBLICATIONS

"Session Splice on Multimedia Communication for Mobile Computing" Authors: Tzu-Chi Huang, Ce-Kuen Shieh, Wen-Huang Lai, Yu-Ben Miao. 0-76995-2553-9/06 Computer Society, IEEE 2006.*

(Continued)

*Primary Examiner* — Ian N Moore
*Assistant Examiner* — Thai Nguyen
(74) *Attorney, Agent, or Firm* — Lin & Associates IP, Inc.

(57) ABSTRACT

The present invention relates to an apparatus and method for splicing multimedia session on communication networks. The apparatus comprises a handoff manager, a session migration manager and a session splicing module. The handoff manager monitors whether a mobile host is roaming to other subnets or not, and acquires a new IP address and issues a control signal when a handoff event is triggered. When a user triggers a migration action, the session migration manager, based on the monitoring status of an ongoing session, sends a state message to a target host for performing session migration, enables a media player, and issues another control signal. The session splicing module respectively receives the two control signals, and performs a corresponding session splicing for each control signal to persist session connection.

21 Claims, 16 Drawing Sheets

U.S. PATENT DOCUMENTS

| | | | |
|---|---|---|---|
| 2009/0063690 A1* | 3/2009 | Verthein et al. | 709/228 |
| 2009/0210536 A1* | 8/2009 | Allen et al. | 709/227 |
| 2009/0232220 A1* | 9/2009 | Neff et al. | 375/240.21 |
| 2010/0189124 A1* | 7/2010 | Einarsson et al. | 370/432 |

OTHER PUBLICATIONS

Henry Song, Hao-Hua Chu, Shoji Kurakake, "Browser Session Preservation and Migration", Poster Session of WWW Conference, Hawaii, U. S. A., May 7-11, 2002.

M. Hasegawa et al., "Cross-Device Handover Using the Service Mobility Proxy", in Proceedings of WPMC2003, Yokosuka, Japan, Oct. 2003.

C. M. Huang, C. H. Tsai, and M. C Tsai, "Design and Implementation of Video Streaming Hot-Plug between Wired and Wireless Networks Using SCTP", in the Computer Journal, vol. 49, No. 4, pp. 400-417, Jun. 2006.

Oberle Karsten, Wahl Stefan and Sitek Arkadiusz, "Enhanced Methods for SIP based Session Mobility in a Converged Network", Mobile and Wireless Communications Summit, pp. 1-5, Jul. 2007.

Tadashi Okoshi, Masahiro Mochizuki, Yoshito Tobe, and Hideyuki Tokuda, "Mobile Socket: Toward Continuous Operation for Java Applications", in Proceedings of IEEE International Conference on Computer Communications and Networks, pp. 50-57, Natick, Massachusetts, Oct. 1999.

Sujeet Mate, Umesh Chandra, Igor D. D. Curcio, "Movable-Multimedia: Session Mobility in Ubiquitous Computing Ecosystem", in ACM Proceedings of the 5th International conference on Mobile and Ubiquitous Multimedia, vol. 193, Dec. 2006.

D. A. Maltz and P. Bhagwat, "MSOCKS: An Architecture for Transport Layer Mobility", IEEE INFOCOM 1998.

Fabien Hantz and Julien Herriet, "Multimedia flow transmission policies for collaborative platform based on SOAP", in IEEE Proceedings of the First International Conference on Distributed Framework for Multimedia Applications, 2005.

P. Bellavesta, A. Corradi, L. Foschini, "MUM: a Middleware for the Provisioning of continuous Services to Mobile Users", in Proceedings of the 9th International symposium on computers and Communications, pp. 498-505, Jun. 2004.

H. Chu, H. song, C. Wong, K. Kurakake, and M. Katagiri, "ROAM, A seamless Application Framework," in Journal of Systems and Software, vol. 69, Issue 3, pp. 209-226, Jan. 2004.

Yi Cui, Klara Nahrstedt and Dongy An Xu, "Seamless User-Level Handoff in Ubiquitous Multimedia Service Delivery", Multimedia Tools and Applications Journal (ACM/Kluwer), Special Issue on Mobile Multimedia and Communications and m-Commerce, Feb. 2004.

T. C. Huang, C.K. Shieh, W. H. Lai, and Y. B. Miao, "Session Splice on Multimedia Communication for Mobile Computing", in IEEE International Conference on Sensor Networks, Ubiquitous, and Trustworthy Computing (SUTC 2006), vol. 3, pp. 166-171, Jun. 2006.

B. Landfeldt, t. Larsson, Y. Ismailov, and A. Seneviratne, "SLM, a Framework for Session Layer Mobility Management", in Proceedings of the 8th International Conference on Computer Communications and Networks, pp. 452-456, Oct. 1999.

L.D. Chou and J. M. Chen, "Streaming Media Delivery in Heterogeneous Wireless Networks", Ph. D. Dissertation, National Central University, Taoyouan, Taiwan, Jul. 2006.

* cited by examiner

| TYPE | DESCRIPTION |
|---|---|
| SERVER IP INFORMATION | TO ESTABLISH A TCP CONNECTION |
| URI INFORMATION | AVAILABLE RESOURCE TO CALL MEDIA PLAYER TO POSITION REMOTE OR LOCAL END |
| HTTP MESSAGE | REFERRED BY TARGET HOST WHEN ESTABLISHING HTTP SESSION |
| MEDIA TYPE | DIFFERENT MEDIA TYPES WILL TRIGGER DIFFERENT PROCESSES |

FIG. 7

| STCO | STSZ | STSO | STSS | STTS | CTTS |

| METADATA BOX | DESCRIPTION |
|---|---|
| STCO | SAMPLE SIZE PER SAMPLE |
| STSZ | CHUNK OFFSET TO EACH CHUNK |
| STSO | SAMPLES PER CHUNK |
| STSS | SAMPLE ENTRY FOR EACH SYNC SAMPLE |
| STTS | DECODING TIME TO EACH SAMPLE |
| CTTS | COMPOSITION TIME TO EACH SAMPLE |

FIG. 15

APPARATUS AND METHOD FOR SPLICING MULTIMEDIA SESSION ON COMMUNICATION NETWORKS

FIELD OF THE INVENTION

The present invention generally relates to an apparatus and method for splicing multimedia session on communication networks.

BACKGROUND OF THE INVENTION

The next wave for the network management and wireless development, such as WiFi to WiMax and 3G to 4G, is to integrate the wired and wireless networks to form as fixed-mobile convergence (FMC) network environment for offering more services. The FMC coupled with IP multimedia subsystem (IMS) is also a trend for voice, video, data and mobility service. In other words, the widespread network industry is moving towards the portable and conventional devices equipped with network interfaces to provide people with more service options anywhere and anytime.

Multimedia streaming service is a key application on FMC network. Real-Time Streaming Protocol (RTSP)/Real-Time Protocol (RTP) are typical protocols for linear video stream and. HyperText Transfer Protocol (HTTP) is a typical protocol for non-linear video stream. However, due to the mobility requirement, the ongoing session may be interrupted during handoff across networks or session migration across devices.

Two cases are often considered on how to keep ongoing session continuous. One is the issue of inter-interface or inter-network handoff, and the other is the issue of inter-device session migration. Many approaches have been developed. For example, WO0131472 disclosed a mobility management protocol targeting at 3G-IP environment to support the real time and non-real time multimedia application on mobile device. The patent document disclosed a technique supporting SIP-based applications, but does not provide a complete mobility management solution for non-SIP-based multimedia applications.

U.S. Patent Publication No. 2007/0171895 disclosed a method for seamless handover to roaming terminal for multimedia stream session. As shown in FIG. 1, moving caller 104, such as a user agent client, is attached to the current domain A through an interface element 103. Mediating network element 110 on communication network 100 is comprised in a communication path of a server 105, such as user agent server, connecting to remote domain 115, to ensure the security of session ID, such as digital signature, or the encoding method of the multimedia stream so as to allow server 105 for identification.

Then, mediating network element 110 monitors the address change of the roaming terminal in the media overlay level of the multimedia stream session, and redirects the multimedia stream to updated address. Then, another mediating network element 120 at the control layer is used to replace mediating network element 110. In this manner, moving caller 104 is switched to a different domain B. The patent publication document disclosed a technique utilizing mediating network element to support mobility management for multimedia applications.

Two types of media formats are mainly used in the transmission of streaming service. FIG. 2 shows an exemplary schematic view of comparing these two formats. As shown in FIG. 2, the left side of the figure is metadata-spreading format. In other words, the metadata with metadata-spreading format is spread all over the entire file, and the media data is also spread all over the entire file. Each pair of the metadata and media data is recorded chronically. This type of media format may be used to transmit a linear multimedia stream, and usually uses RTSP/RTP as transmission protocol. The right side of the figure is metadata-gathering. In other words, all the metadata is gathered in a metadata block 210, and all the media data is gathered in a media data block 220. This type of media format may be used to transmit a non-linear multimedia stream and usually uses HTTP as transmission protocol.

The conventional techniques may only solve a part of mobility management problems of the metadata-spreading multimedia streaming. Therefore, it is imperative to devise a new mechanism applicable to splicing session of non-linear multimedia stream in addition to splicing session of linear multimedia stream so that the mobile multimedia streams with metadata-spreading or metadata-gathering format may keep ongoing session continuous.

SUMMARY OF THE INVENTION

The present invention relates to an apparatus and method for splicing multimedia session on communication networks.

In an exemplary embodiment, the disclosed relates to an apparatus for splicing multimedia session on communication networks, comprising a handoff manager, a session migration manager and a session splice module. The handoff manager monitors whether a mobile host is roaming to other subnets or not, and acquires a new IP address and issues a control signal when a handoff event is triggered. When a user triggers a migration action, the session migration manager, based on the monitoring status of an ongoing session, sends a state message to a target host for performing session migration, enables a media player, and issues another control signal. The session splicing module respectively receives the two control signals, and performs a corresponding session splicing for each control signal to keep ongoing session continuous.

In another exemplary embodiment, the disclosed relates to a method for splicing multimedia session on communication networks, comprising: monitoring whether a mobile host is roaming to other subnets or a media client triggers a migration action; acquiring a new IP address when a handoff event is triggered; when a user triggers a migration action, based on the monitoring status of an ongoing session, sending a state message to a target host and enabling a media player; and for the triggered handoff event or the migration event, performing a corresponding session splicing for each event to keep ongoing session continuous for the mobile host or the media client.

The foregoing and other features, aspects and advantages of the present invention will become better understood from a careful reading of a detailed description provided herein below with appropriate reference to the accompanying drawings.

BRIEF DESCRIPTION OF THE DRAWINGS

FIG. 7 shows an exemplary content of the state message, consistent with certain disclosed embodiments of the present invention.

FIG. 15 shows a schematic view illustrating an exemplary reconstructed metadata, consistent with certain disclosed embodiments of the present invention.

DETAILED DESCRIPTION OF THE PREFERRED EMBODIMENTS

The exemplary embodiments of the present invention achieve the splicing multimedia stream through session splice technique to keep the ongoing session continuous, such as, during inter-interfaces/inter-network handoff or inter-device session migration. Hence, the technique of the present invention not only considers the application of session splice to linear multimedia stream but also considers the application of session splice to non-linear multimedia stream to keep the ongoing session continuous.

The disclosed embodiment of the present invention provides a metadata reconstruction mechanism to support the two media formats, i.e., metadata-spreading and metadata-gathering. Through the metadata reconstruction mechanism, the present invention designs the mechanism of splicing multimedia stream on the communication networks so that under different internet protocols, such as HTTP transmission protocol or RTSP/RTP transmission protocol, the convenience of session splice may be maintained when performing session splice. In the mean time, the present invention may ensure the security of the multimedia session when crossing network interface/domain boundary or migrating to difference devices.

According to the present invention, before the process for splicing multimedia session is triggered, the media client, such as mobile host, must monitor the progress of ongoing sessions and log the related data for the ongoing sessions. The progress of the ongoing session may include, such as, the splicing point between old session and new session. That is, which byte data the mobile host will receive at the splicing point, and the related data of the ongoing session needs to be logged includes the related data needs to be used when the splicing is performed between the old session and the new session.

Figure 1:
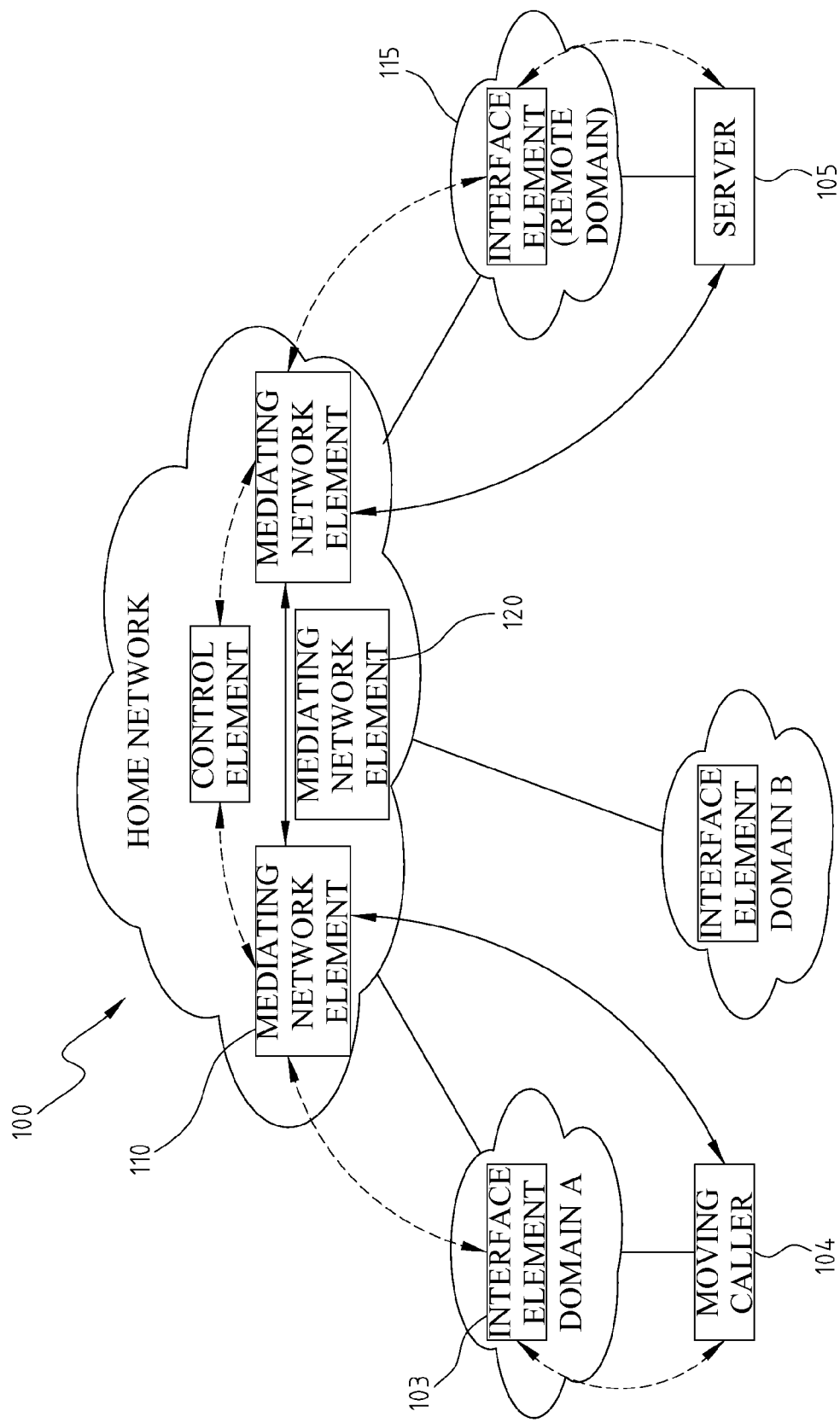
FIG. 1 shows an exemplary schematic view of a system structure of seamless handover to roaming terminal for multimedia stream session.
Figure 2:
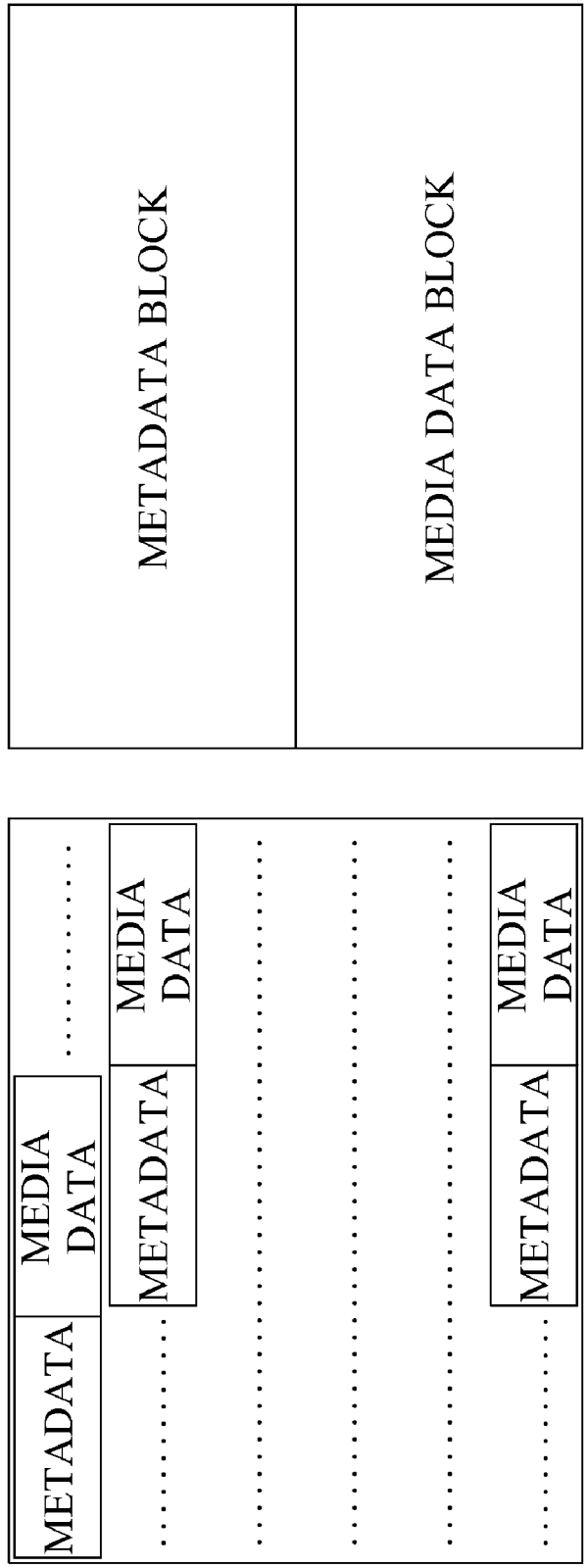
FIG. 2 shows an exemplary schematic view of the metadata format of HTTP transmission protocol and RTSP/RTP transmission protocol.
Figure 3:
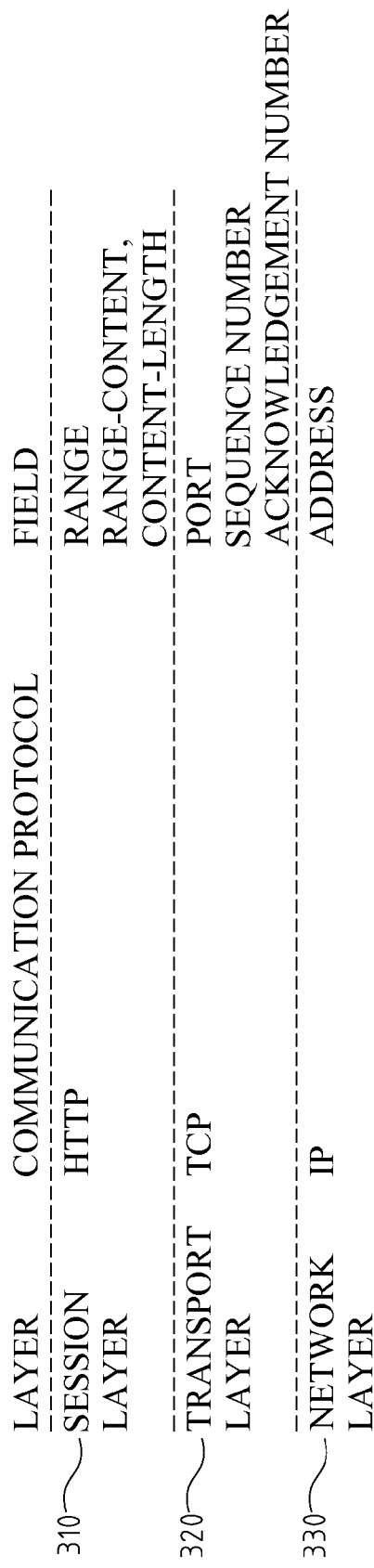
FIG. 3 shows an exemplar of the related data required to be translated in each layer of the Open System Interconnection (OSI) model when two sessions are to be spliced into one session, consistent with certain disclosed embodiments of the present invention.

FIG. 3 shows an exemplar of the related data required to be translated in each layer of the Open System Interconnection (OSI) model when two sessions are to be spliced into one session, consistent with certain disclosed embodiments of the present invention. As shown in FIG. 3, session layer 310 needs to translate the range, range-content and content-length fields of the HTTP transmission protocol. Transport layer 320 needs to translate the port, sequence number, acknowledgement number field of the TCP. Network layer 330 needs to translate the IP address field.

Take HTTP transmission protocol as an example. After the aforementioned multimedia session splice process is triggered, the old HTTP session will be terminated. At this point, the media client will use the logged related data of the ongoing session to activate the multimedia session splicing to establish a new HTTP session. Therefore, streaming server will refer to the negotiated range field after the new HTTP session to continue the media data transmission.

When the new HTTP session is established and the correct range field is negotiated, the new data channel is seamlessly spliced to the old data channel. In establishing the stream session splicing, if the transport layer uses TCP connection, the state information of the TCP connection is logged. In addition, if two sessions with different IP addresses are generated, the IP address field also is translated.

Figure 4:
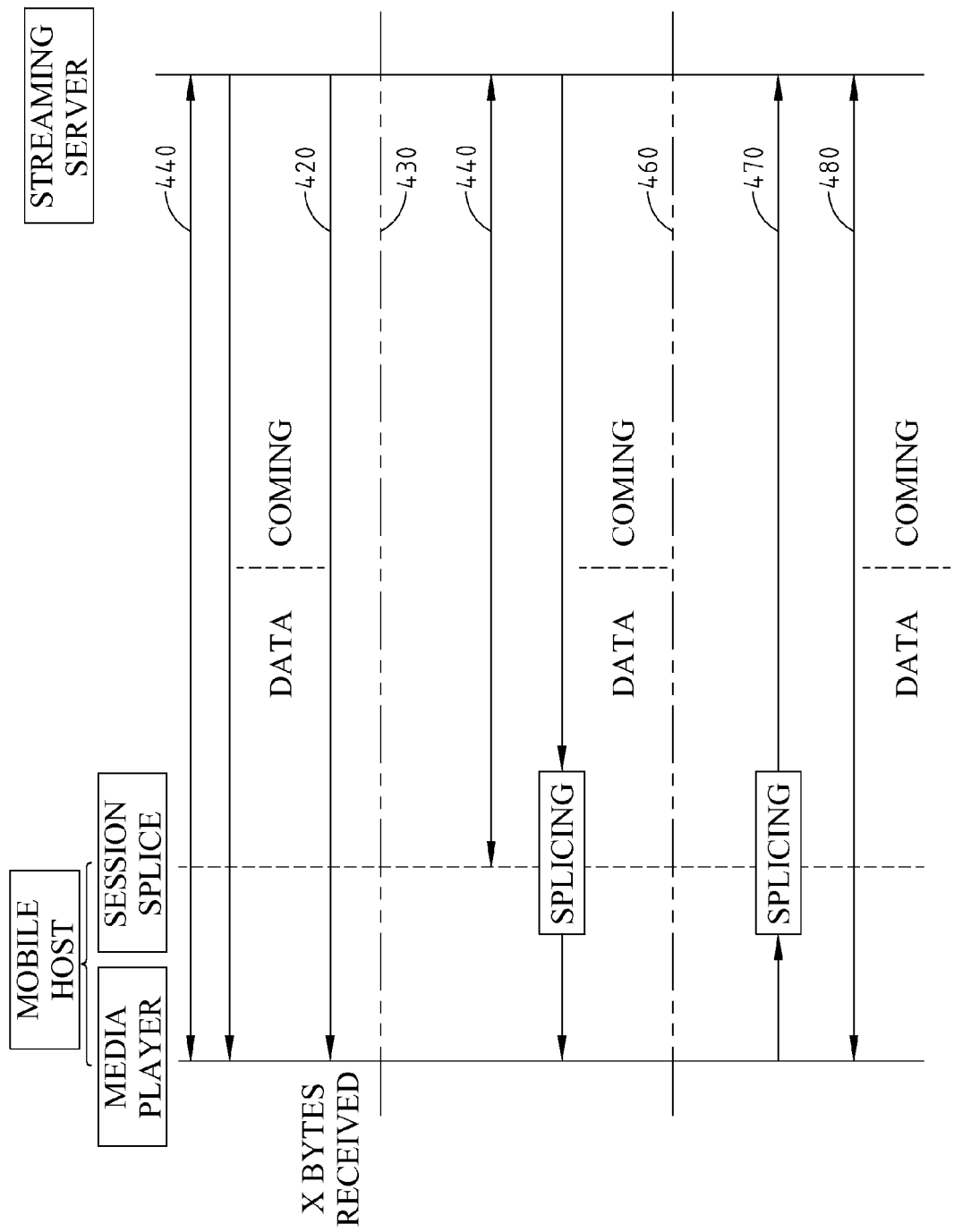
FIG. 4 shows an exemplary sequence of the application of session splice applied to non-linear multimedia stream using HTTP transmission protocol as an example, consistent with certain disclosed embodiments of the present invention.

FIG. 4 shows an exemplary sequence of the application of session splice applied to non-linear multimedia stream using HTTP transmission protocol as an example, consistent with certain disclosed embodiments of the present invention. As shown in FIG. 4, in the HTTP communication between the media player on the mobile host and the streaming server, the old HTTP session setup has a range field with the offset 0, marked as 410. Streaming server refers to the correct value of negotiated HTTP range field after the session is established to transmit x bytes to the media player on the mobile host, marked as 420. As aforementioned, before the multimedia session splice process is triggered, the mobile host must monitor the progress of the ongoing session and log the related of the ongoing session. After triggering the event of multimedia session splice 430, the mobile host and the streaming server establish the new HTTP session, with the range field having an offset set as 0, marked as 440. Then, the mobile host starts to execute session splice process 450 to splice the new data channel to the old data channel, and the streaming server refers to the correct value of negotiated HTTP range field after the session is established to transmit multimedia data to the media player on the mobile host.

After the splicing of old data channel and new data channel, if the media player on the mobile host intends to execute a forward or rewind action 460, the media player terminates the current HTTP session through a session splice process 450, marked as 470. Then, according to the request, the new byte location is used to re-establish an HTTP session with the streaming server, with the range field having an offset set as Z, marked as 480. The streaming server will continue to transmit multimedia data. If the media player on the mobile host is on a different domain, the IP address field needs to be translated.

Figure 5:
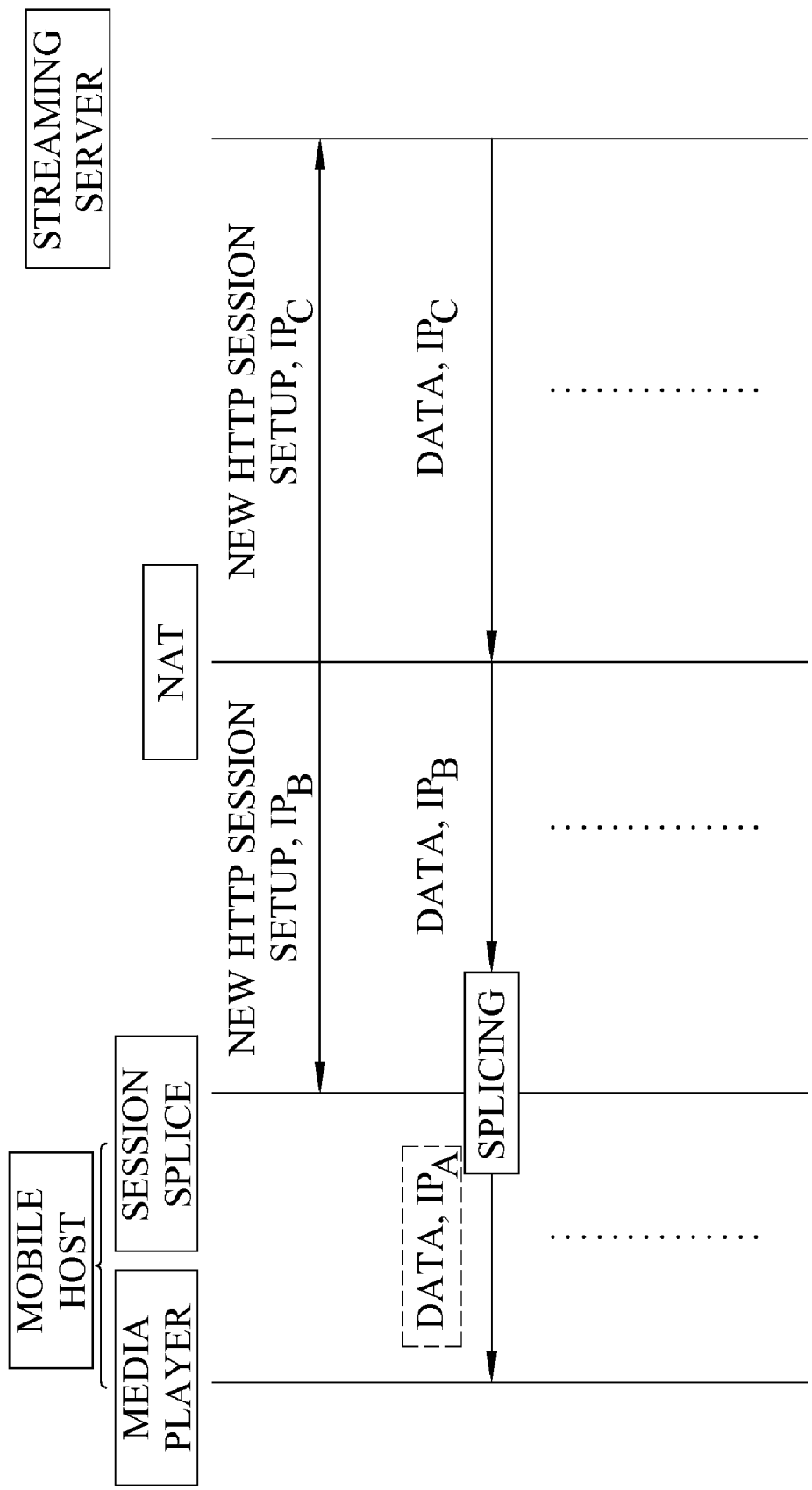
FIG. 5 shows an exemplary schematic view of session splicing the multimedia stream behind the network address translator (NAT), consistent with certain disclosed embodiments of the present invention.

Take HTTP transmission protocol as an example. FIG. 5 shows an exemplary schematic view of session splicing the multimedia stream behind the network address translator (NAT), consistent with certain disclosed embodiments of the present invention. FIG. 5 helps to understand the compatibility of the multimedia stream splice process of the present invention and the standard HTTP scenario, and is accomplished within the mobile host. Therefore, even though the session splice process is triggered behind the NAT 510 and the IP address is translated ($IP_b \rightarrow IP_c$ or $IP_c \rightarrow IP_b$), the session splice technique will not affect the transparency of HTTP transmission protocol through the NAT. Therefore, the present invention is applicable to all the aforementioned scenarios.

The multimedia stream session splice technique of the present invention is applicable to various conditions, such as, during inter-interface/inter-network handoff or inter-device session migration, while keeping session connection. When the session splice technique is applied in different condition, the process requires some detailed operations described as follows.

When the splicing technique of multimedia stream is applied to the handoff, the network layer changing is the focus. When a mobile host is under the condition of handoff, the foreign network IP address is different from the original IP address. Therefore, the mobile host at the media client needs to request a new IP address from the foreign network and verifies that the new IP address is a valid IP address. The above two steps may be accomplished before or after the handoff. In the exemplary embodiments of the present invention, the session splice process is divided into a host preparing state and a splicing state.

Figure 6:
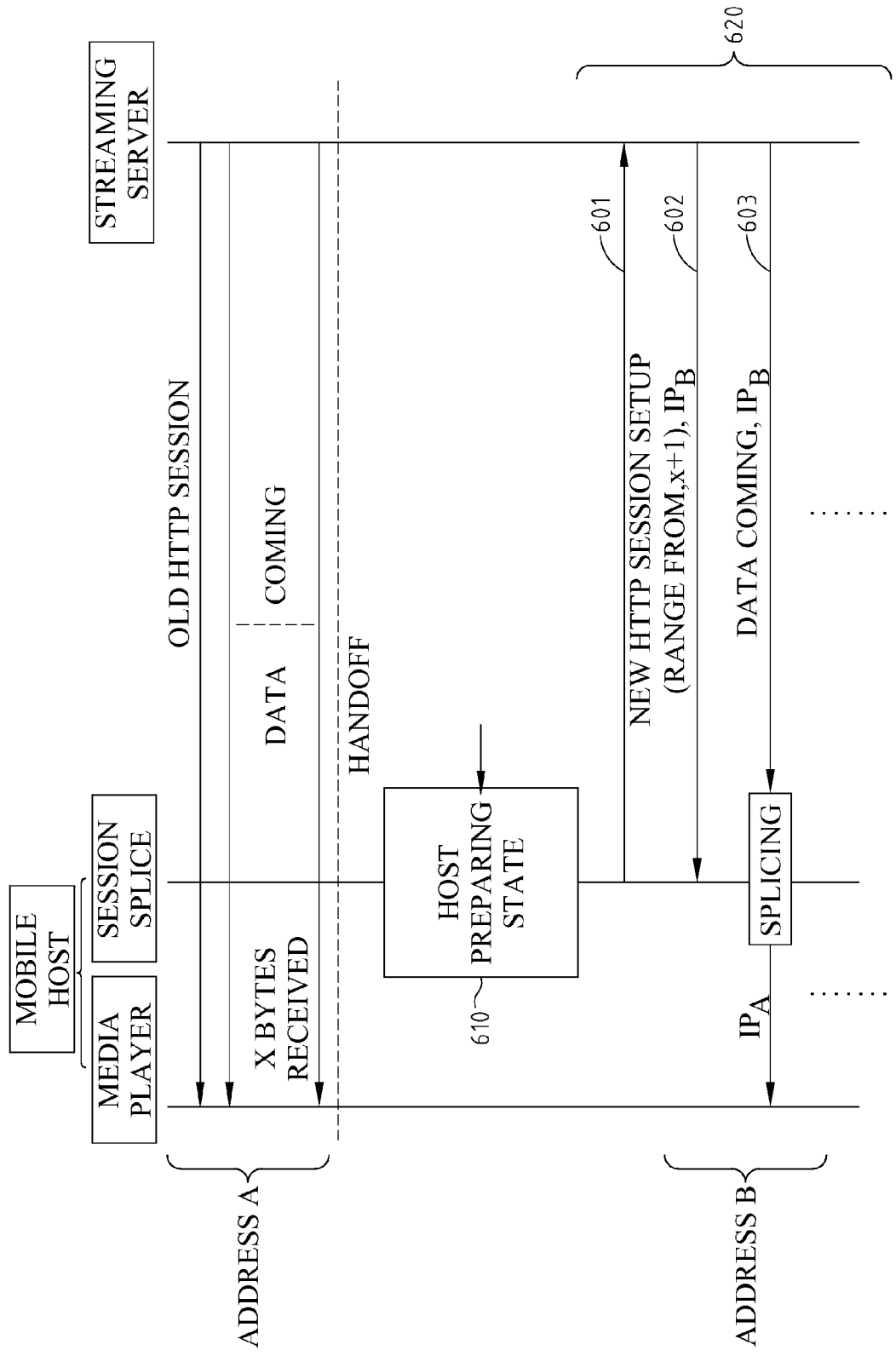
FIG. 6 shows an exemplary sequence of splicing a multimedia stream session in handoff, consistent with certain disclosed embodiments of the present invention.

When the session splice process is in the host preparing state, it is to establish a working environment on the foreign network. A correctly executed host preparing state enables the success of the session splice process. When session splice process is in the splicing state, the IP address is required to be translated. In addition, the splicing point must be selected as the position following to the old session to keep session connection. For example, when the media client receives x bytes in old session, the splicing point must be selected as starting at $(x+1)^{th}$ byte when requesting the establishment of the new session. FIG. 6 shows an exemplary sequence of splicing a multimedia stream session in handoff, consistent with certain disclosed embodiments of the present invention, wherein a mobile host is roaming from address A to address B.

In FIG. 6, the mobile host at address A in old session, for example, old HTTP session, receives x bytes. When the handoff occurs, the process enters the host preparing state 610 to establish the working environment on the foreign network. Then the process enters splicing state 620. The duration of the splicing state includes the following steps. Step 601 is to terminate the old session between the mobile host and the streaming server and transmitting original IP address $IP_A$ to the streaming server. Step 602 is to establish new session between the mobile host and the streaming server. The splicing point is selected as starting at the $(x+1)^{th}$ byte, and IP address $IP_A$ is translated to a valid new IP address $IP_B$. Step 603 is to splice the old data channel to the new data channel through a splice process. In other words, through the splice process, the streaming server will refer to the newly established HTTP session and the new IP address $IP_B$ to continue the transmission of multimedia data to the mobile host at the media client. The mobile host at the media client will translate IP address $IP_B$ back to original IP address $IP_A$ and transmit the received multimedia data to the media client at new address B.

When the multimedia stream session splice technique is applied to the session migrating to different devices, in addition to the seamless reception of the target host of data from the source host in ongoing session, another important issue is how to transmit the session state of the source to the target host. As aforementioned, the source host in the present invention must monitor the progress of the ongoing session and log the related data of the ongoing session for the reference of session splice process. When session migrates to a different device, the splice process must be executed on a different host, instead of the original host. Therefore, all the information on the session splice must be packed into a message, and the message is transmitted to the target host. FIG. 7 shows an exemplary content of the state message, consistent with certain disclosed embodiments of the present invention. FIG. 7 lists all the information that must be sent to the target host.

In FIG. 7, the server IP information is for establishing the TCP connection. The Uniform Resource Identifier (URI) information is for calling media player to position the remote or the local available resource. The HTTP information is for the target host to refer when establishing the HTTP session. Different media types will trigger different processes.

After the source host prepares the state message, the state message will be sent to the target host to trigger the session migration process. If the TCP is used as the transport layer communication protocol, the state message will not be lost when the target host is notified. The main point of using session splicing to achieve the session migration is how to make media player continue playing the multimedia data from the interrupted point at the source host. In the present invention, the disclosed exemplary embodiments use the flow in FIG. 8 to achieve the session migration.

Figure 8:
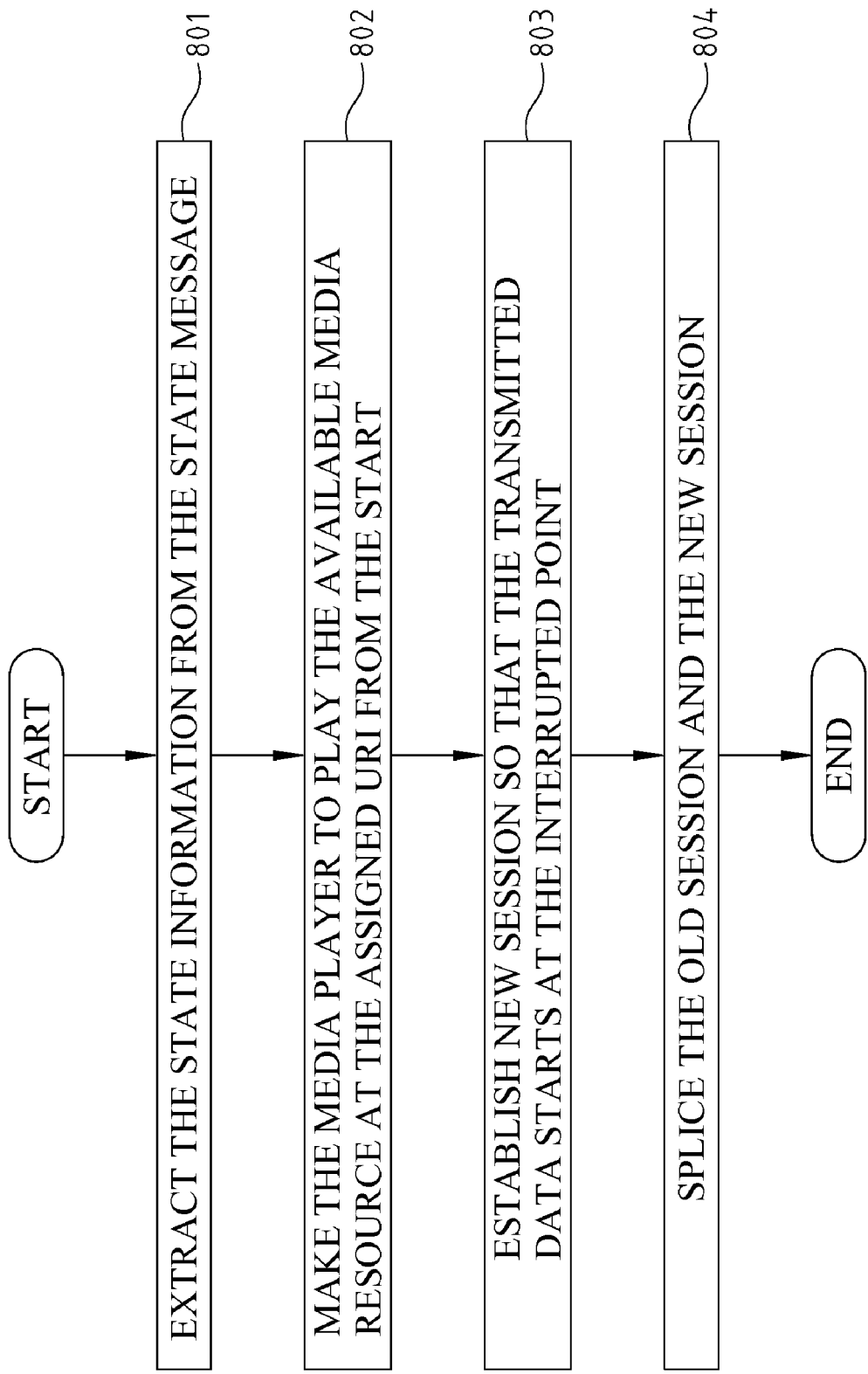
FIG. 8 shows an exemplary flowchart of the session migration process, consistent with certain disclosed embodiments of the present invention.

Referring to FIG. 8, step 801 is to extract the state information from the state message, such as the related information on the interrupted point at the source host. Step 802 is to make the media player to play the available media resource at the assigned URI from the start. Step 803 is to establish a new session so that the transmitted data starts at the interrupted point. Step 804 is to splice the old session and the new session. All the above steps include other small detailed operation when used in different metadata formats. The following describes the application to metadata-spreading and metadata-gathering formats.

Figure 9:
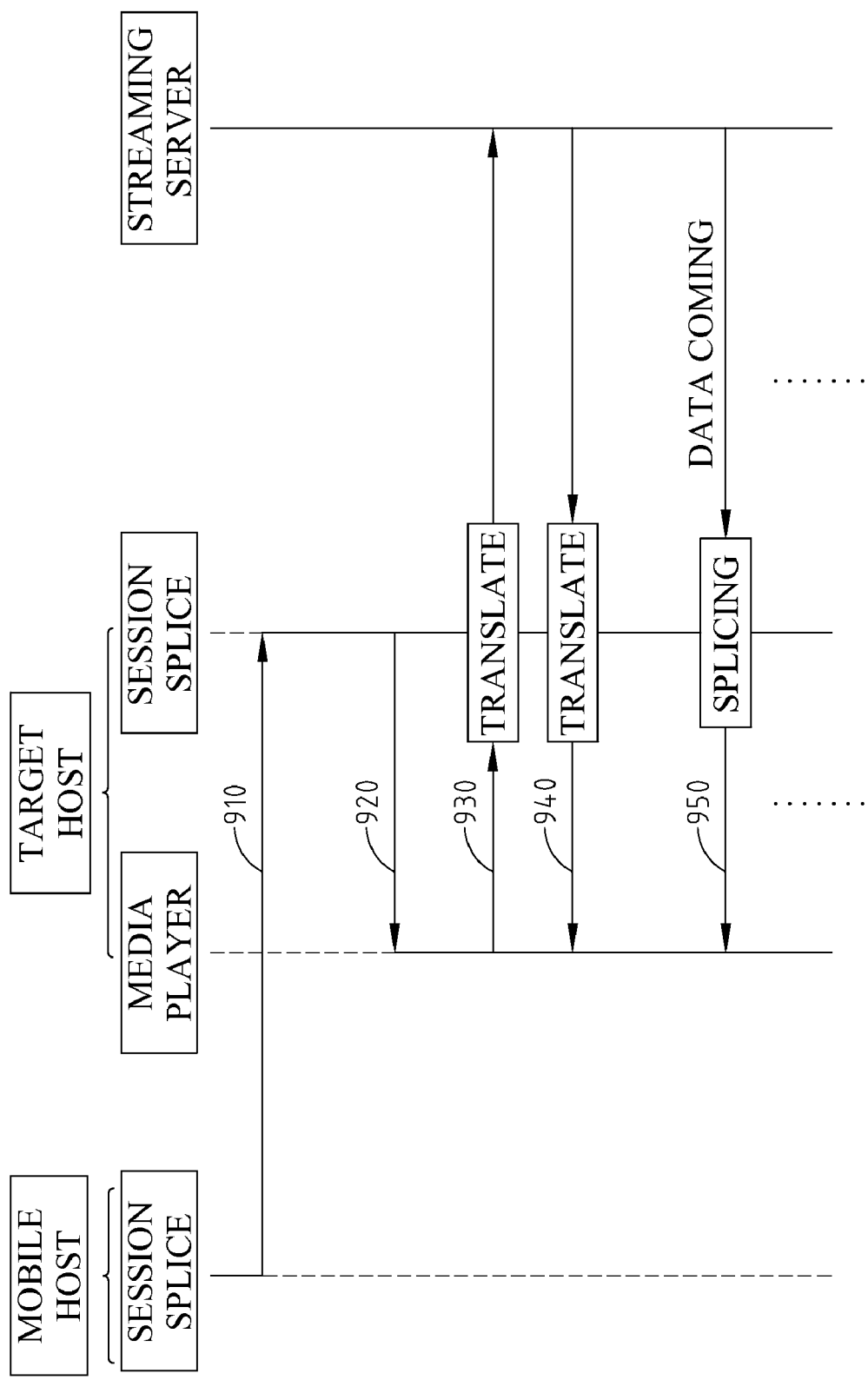
FIG. 9 shows an exemplary sequence of splicing a multimedia stream session in session migration using metadata-spreading format, consistent with certain disclosed embodiments of the present invention.

FIG. 9 shows an exemplary sequence of splicing a multimedia stream session in session migration using metadata-spreading format, consistent with certain disclosed embodiments of the present invention.

In FIG. 9, through the session splicing, the state information extracted from the source host is transmitted to the target host, marked as 910, and a system call to the media player is made, marked as 920. Through the session splicing, the target host translates the starting point of the range field requested by the transmission protocol, such as, HTTP Request (Range from 0), into the interrupted point, such as, HTTP Request (Range from x), and then transmits to the stream server, marked as 930. The information on the interrupted point is extracted from the state information. The streaming server rectifies the contents-range and the content-length of the transmission protocol response, such as, HTTP Response, and transmits the response to the target host. Through the session splicing, the target host translates the range field into the starting point and responds to the media player on the target host, marked as 940. Then, the old session and the new session between media player on the target host and streaming server are spliced, marked as 950.

In other words, the new data channel is spliced to the old data channel and the media player is made to believe that the new session starts from the beginning, while the session actually starts from a certain point in-between. Because the payload of the transmission protocol request and the transmission protocol response is adjusted during the session splicing, the related TCP connection information of the transport layer, such as, serial number and response acknowledge field, is different from the original TCP connection. Therefore, the related information must be also translated during splicing TCP connection.

During session migration, the media player thinks that the media data starts from the beginning, and refers to the metadata from the start of header. However, because of the session splicing, the actual media data starts at a certain point in-between. If the media player refers to the metadata from the start of the header and processes the media data starting at a certain point in-between, a mismatch between the metadata and the media data will occur when the session migration uses the metadata-gathering format. In the exemplary embodiments of the present invention, the metadata must be reconstructed to be consistent with the original match. Because the media data must starts at a certain point in-between during session migration, the metadata must be rectified to match the media data.

Figure 10:
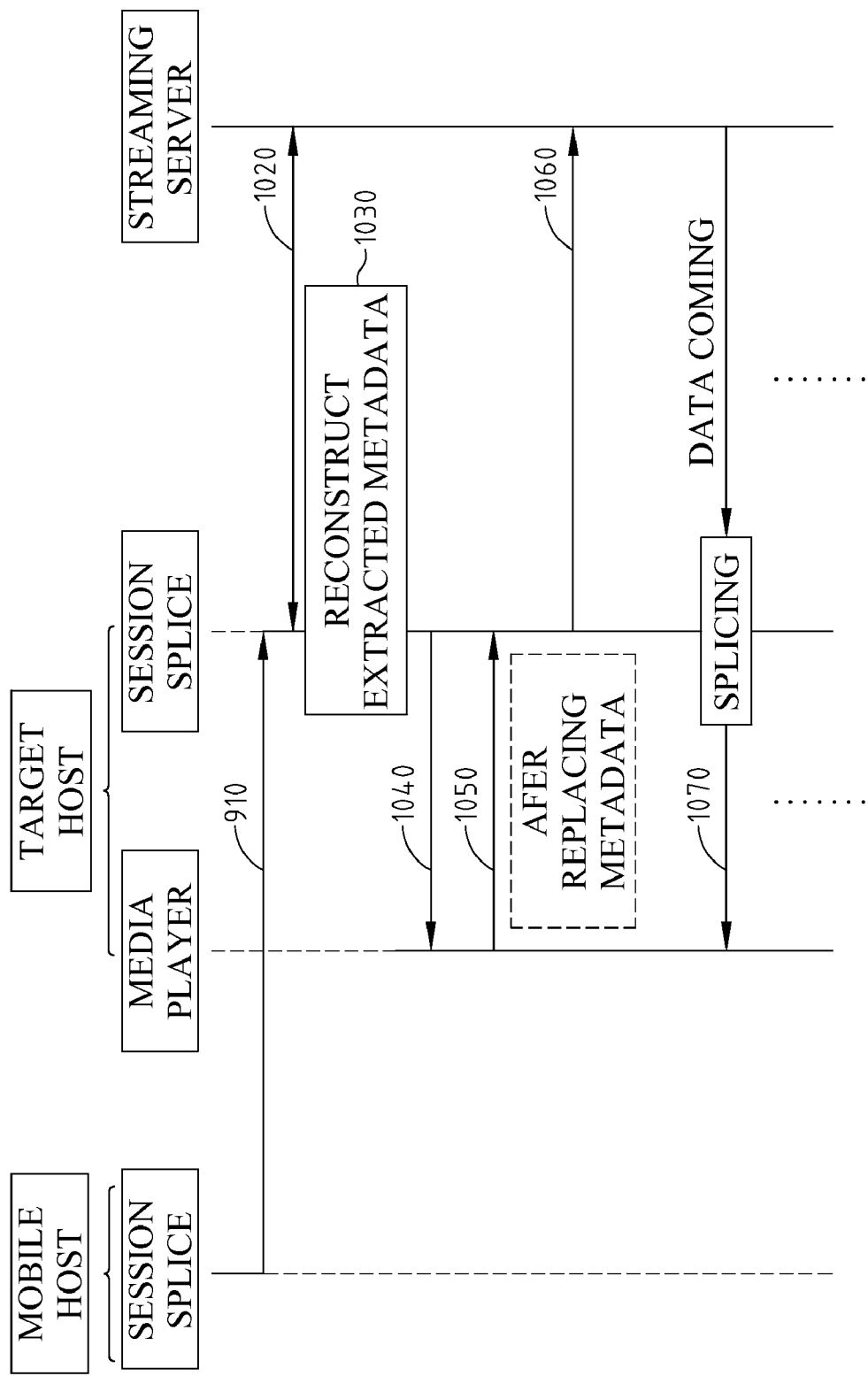
FIG. 10 shows an exemplary sequence of splicing a multimedia stream session in session migration using metadata-gathering format, consistent with certain disclosed embodiments of the present invention.

FIG. 10 shows an exemplary sequence of splicing a multimedia stream session in session migration using metadata-gathering format, consistent with certain disclosed embodiments of the present invention.

As shown in FIG. 10, after the step marked as 910, the metadata of all the migrated media is extracted from the streaming server or the source host, and is transmitted to the target host, marked as 1020. While the target host may fetch the original media metadata from the mobile host or the streaming server. Then, based on the interrupted point of the media data, the extracted metadata is reconstructed, marked as 1030. An URI is enabled and assigned to the media player, marked as 1040. Then, the transmitted metadata is replaced by the reconstructed metadata to establish a session with the starting point as the offset value between the media player and the target host, marked as 1050. After replacing metadata, a new session between the target host and the streaming server is established, and a request for media data with the interrupted point of the media data on the target host as the offset value is issued to the streaming server, marked as 1060. The target host splices the old session and the new session between the media player and the streaming server, marked as 1070, to accomplish the multimedia streaming splicing in a session migration using metadata-gathering format.

Although the media player thinks that the media data starts at the beginning and the metadata also starts at the beginning, actually both metadata and the media data are extracted from the interrupted point of the session. In this manner, the metadata and the media data are consistent.

Figure 11:
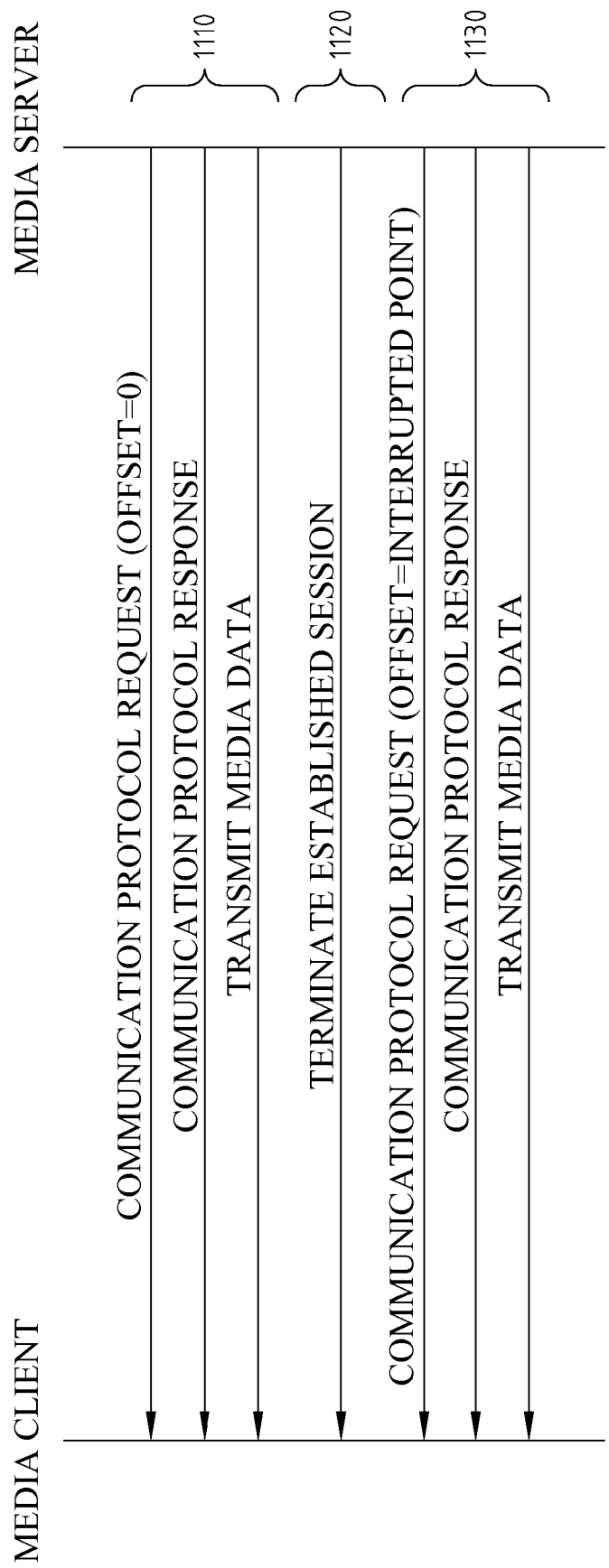
FIG. 11 shows an exemplary solution to the multimedia streaming splicing on communication networks, consistent with certain disclosed embodiments of the present invention.

FIG. 11 shows an exemplary solution to the multimedia streaming splicing on communication networks, consistent with certain disclosed embodiments of the present invention. In other words, when used in linear or non-linear multimedia streaming, the communication between media client, such as media player, and media server, such as, streaming server, may follow the exemplar of FIG. 11 to keep the ongoing multimedia streaming session continuous. That is to say, after establishing a session between media player and streaming server, marked as 1110, the next three basic steps include: media client issuing communication protocol request (offset 0) to streaming server, streaming server issuing communication protocol response to media client, and streaming server transmitting media data to media client.

When the ongoing session crosses over to a different network or migrates to a different device, marked as 1120, media client notifies the streaming server to terminate the established session. Then, marked as 1130, the three basic steps are continuously executed, where the offset value in the communication protocol request issued by media client to the streaming server is the interrupted point of the media data during the ongoing session.

Figure 12:
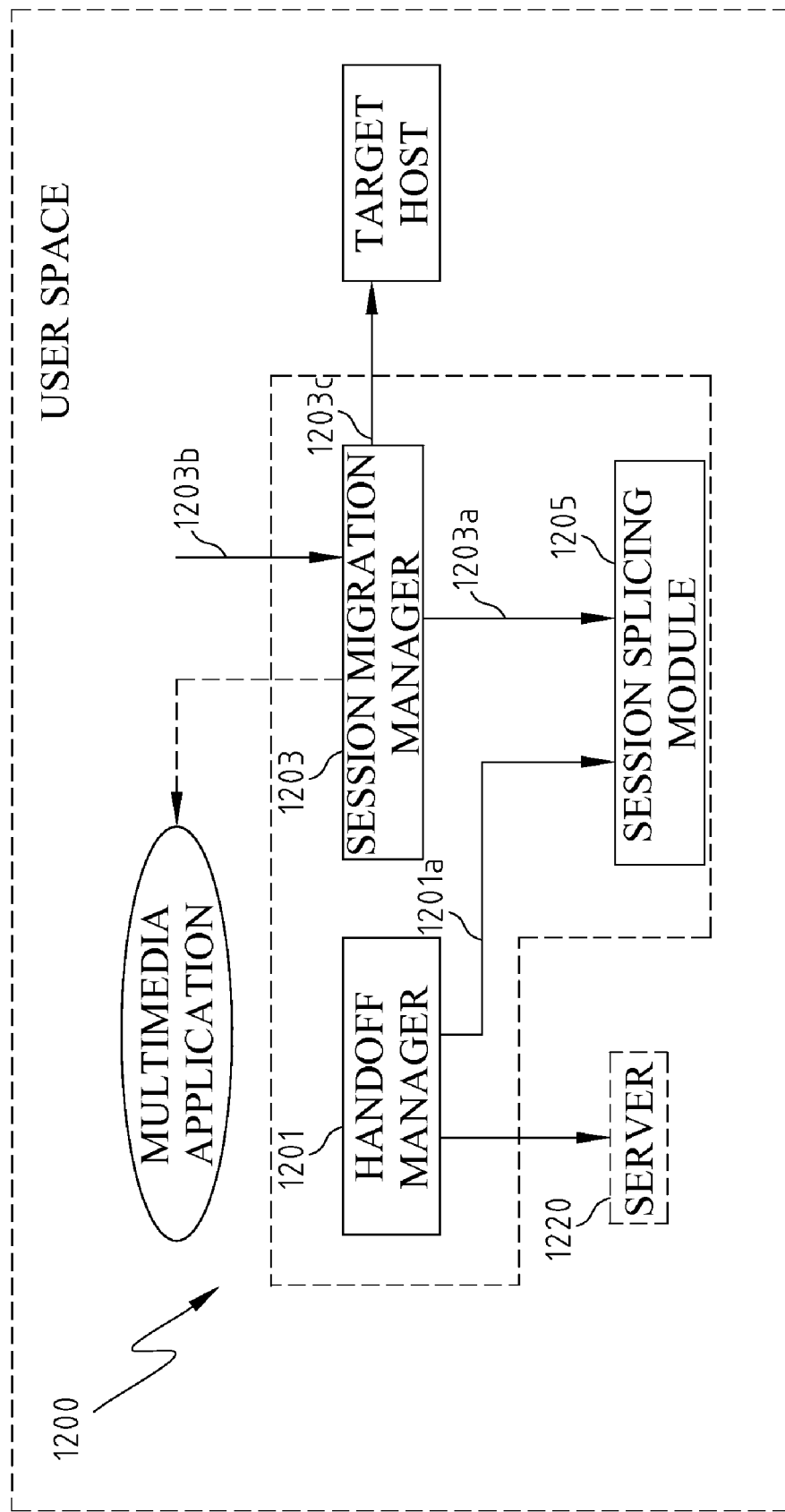
FIG. 12 shows an exemplary system structure of the apparatus for splicing multimedia streaming session on communication networks and the relation and the roles played by elements of the structure, consistent with certain disclosed embodiments of the present invention.

FIG. 12 shows an exemplary system structure of the apparatus for splicing multimedia streaming session on communication networks and the relation and the roles played by elements of the structure, consistent with certain disclosed embodiments of the present invention. The system structure may be arranged on a host of the media client in a communication network environment. The communication network environment has a plurality of subnets and a plurality of mobile devices thereon. The structure of the splicing apparatus is applicable to the user space and may be rectified at the client end.

Referring to FIG. 12, an apparatus 1200 for splicing multimedia streaming session on communication networks comprises a handoff manager 1201, a session migration manager 1203 and a session splicing module 1205. Handoff manager 1201 monitors whether a mobile host is roaming to other subnets or not, and acquires a new IP address, such as asking a dynamic host configuration protocol (DHCP) server 1220, and issues a control signal 1201*a* to notify session splicing module 1205 when a handoff event is triggered.

When a user triggers a migration action, session migration manager 1203, based on monitoring status 1203*b* of an ongoing session, sends a state message 1203*c* to a target host for performing session migration. Session migration manager 1203 also enables a media player, and issues another control signal 1203*a* to notify session splicing module 1205. Session migration manager 1203 extracts an URI from state message 1203*b* to provide to the media player, such as through other control signals to notify the multimedia application in the user space to process.

Session splicing module 1205 respectively receives the two control signals, control signals 1201*a* from handover manager 1201 and control signal 1203*a* from session manager 1203, and performs a corresponding session splicing for each control signal to persist session connection for the mobile host or the media client. In session migration, session splicing module 1205 will provide a metadata reconstruction mechanism to support the metadata-gathering format; that is, if the metadata format of the migrating media session is metadata-gathering format, the metadata reconstruction must be executed. The exemplary solution provided by the present invention is as aforementioned, i.e., by splicing the media session from an interrupted point on the target host.

Figure 13:
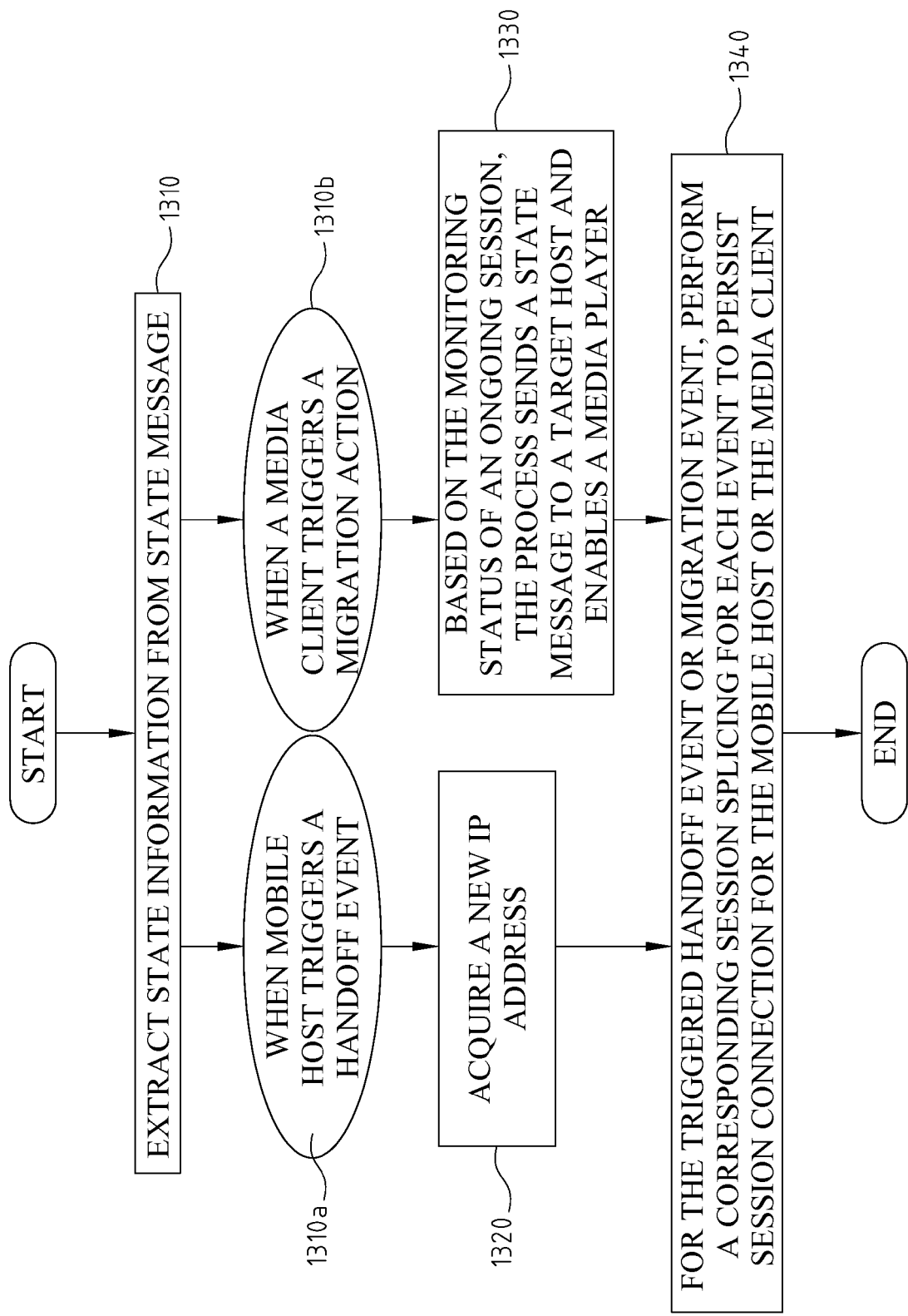
FIG. 13 shows an exemplary flowchart of the method for splicing multimedia streaming session on communication networks, consistent with certain disclosed embodiments of the present invention.

FIG. 13 shows an exemplary flowchart of the method for splicing multimedia streaming session on communication networks, consistent with certain disclosed embodiments of the present invention. Referring to the exemplary flowchart of FIG. 13, step 1310 is to monitor whether a mobile host is roaming to other subnets or a media client is triggering a migration action. Step 1320 is to acquire a new IP address when a handoff event is triggered, marked as 1310*a*. In step 1330, when a user triggers a migration action, marked as 1310*b*, based on the monitoring status of an ongoing session, the process sends a state message to a target host and enables a media player.

Step 1340 is, for the triggered handoff event or migration event, to perform a corresponding session splicing for each event to persist session connection for the mobile host or the media client.

When receiving the control signals, the corresponding session splicing is to perform the inter-interface/inter-network handoff process. The session splicing process is as aforementioned handoff process. When receiving another control signal, the corresponding session splicing process is to perform session migration to a different device. This session splicing process is as the aforementioned session migration process. The details of the session splicing process will not be repeated here.

Figure 14:
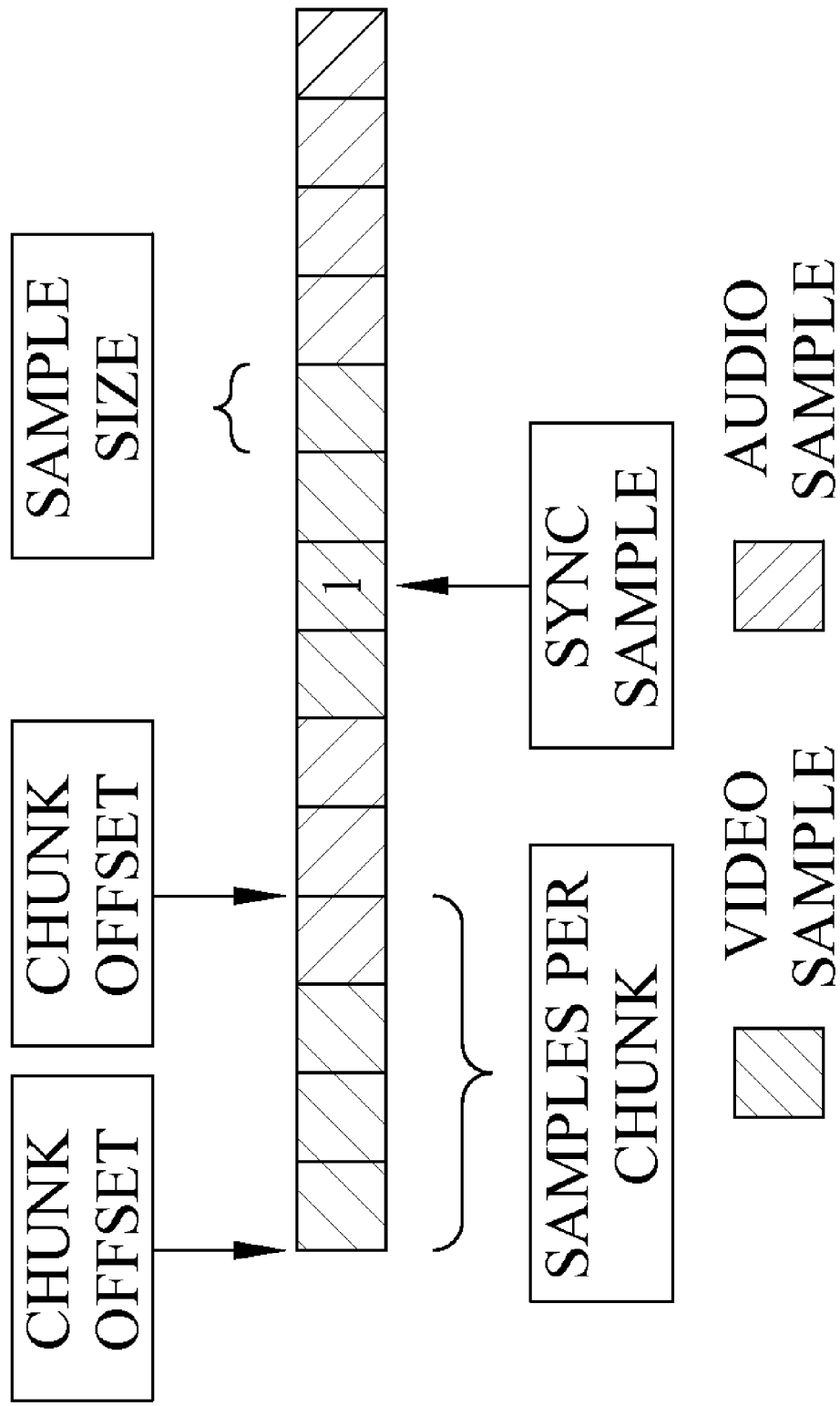
FIG. 14 shows an exemplary schematic view illustrating the media samples arranged in an interleaved and time-ordered manner, consistent with certain disclosed embodiments of the present invention.

The following uses a sample exemplar of H.264 of the MP4 contents as the metadata-gathering format to describe how to reconstruct metadata. The general media may include video track and audio track, and each track consists of a plurality of samples. These samples described in the file may have different sample sizes, and are interleaved and time-ordered. The continuous samples of the same track are called a chunk. Therefore, a video chunk is followed by an audio chunk, and vice versa. FIG. 14 shows an exemplary schematic view illustrating the media samples arranged in an interleaved and time-ordered manner, consistent with certain disclosed embodiments of the present invention. In the media samples of FIG. 14, each video chunk includes four video samples and each audio chunk includes three audio samples. A video chunk is followed by an audio chunk. The starting location of the first sample of each video or audio chunk is the chunk offset of the video or audio chunk.

In the session migration method of the present invention, even though the media player starts to play from the beginning, the requested media data starts at a certain point in-between in the case of session splicing. Therefore, the metadata reconstruction process starts with an interrupted sample, and checks the entire media for re-mapping, i.e., filling the related metadata boxes with new values. Because in the MP4 contents, the I-frame of each video chunk must be pointed out for random access, the I-frame is called sync sample. The information on decoding time to each sample and composition time to each sample must also be pointed out to allow the media player to obtain samples rapidly and conveniently.

Take a sample of metadata-gathering format having H.264 of MP4 contents as example. FIG. 15 shows a schematic view illustrating an exemplary reconstructed metadata, consistent with certain disclosed embodiments of the present invention. As shown in FIG. 15, the reconstructed metadata provides six types of related metadata boxes, STSZ, STCO, STSC, STSS, STTS and CTTS. The following describes the metadata boxes.

The content of metadata box STSZ represents the sample size per sample. The content of metadata box STCO represents chunk offset to each chunk. The content of metadata box STSC represents samples per chunk. The content of metadata box STSS represents sample entry for each sync sample. The content of metadata box STTS represents decoding time to each sample. The content of metadata box CTTS represents composition time to each sample.

Figure 16:
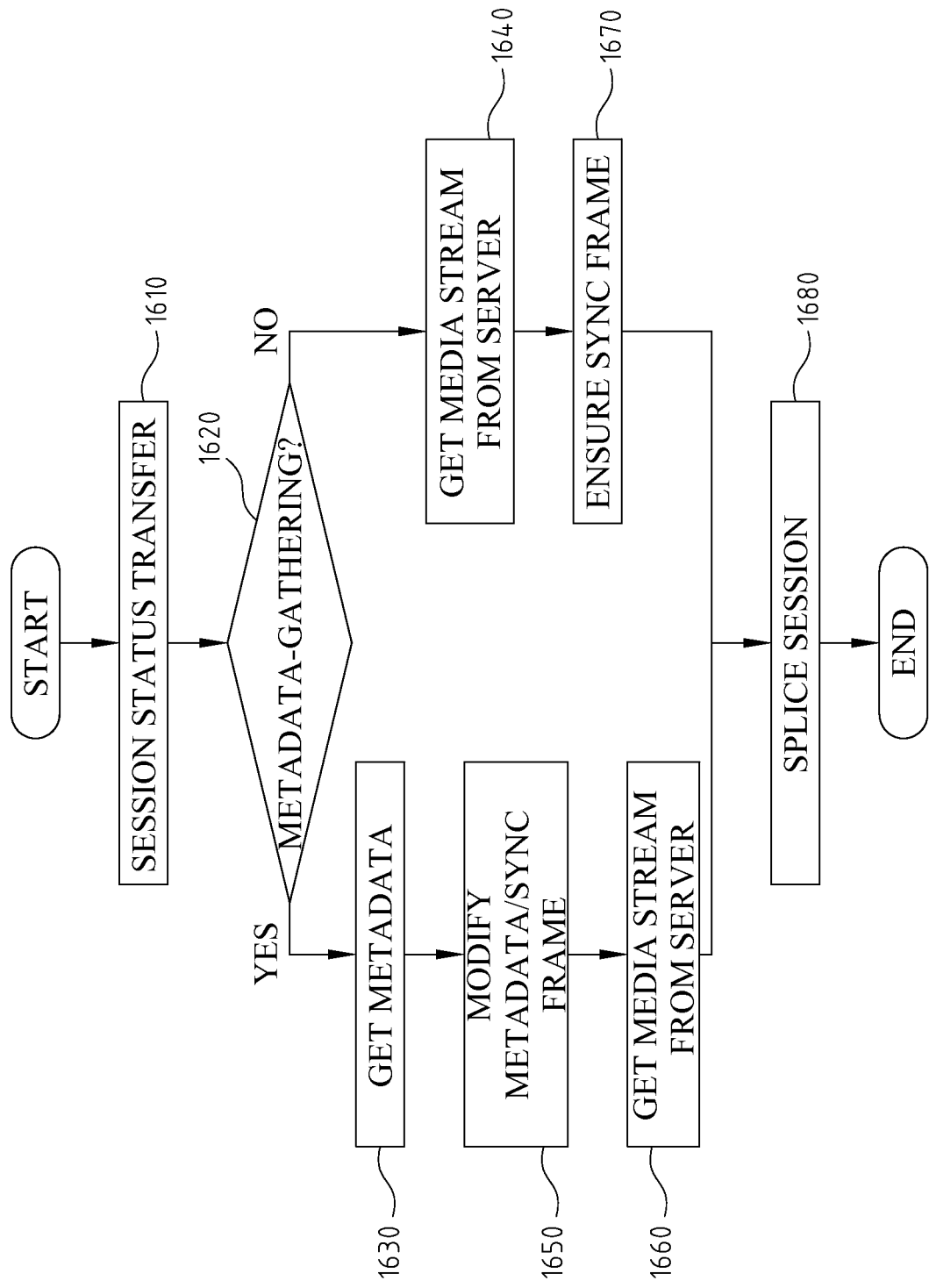
FIG. 16 shows an exemplary schematic view of a state machine corresponding to the state flow of a session migration, consistent with certain disclosed embodiments of the present invention.

Once a media client triggers a migration action, the following describes the session migration state. FIG. 16 shows an exemplary schematic view of a state machine corresponding to the state flow of a session migration, consistent with certain disclosed embodiments of the present invention. Referring to FIG. 16, when a migration is triggered, marked as 1610, the state machine enters the "session status transfer" state, and then enters "metadata-gathering?" state, marked as 1620. If so, the state machine enters the "get metadata" state, marked as 1630; otherwise, the state machine enters "get media stream from server" state, marked as 1640.

After state 1630, the state machine enters "modify metadata/sync frame" state, marked as 1650, and then enters "get media stream from server" state, marked as 1660. After state 1640, the state machine enters "ensure sync frame" state, marked as 1670.

After state 1660 or 1670, the state machine enters "splice session" state, marked as 1680.

According to the present invention, when new metadata is ready, during the session splicing process, the media player is called to establish the media session and is monitored to replace the new metadata. Once the media player completes the receiving of new metadata, the "splice session" state will cut off the old session and splice to a new media session. The new media session starts at a certain interrupted point and the new metadata may be suitably mapped to new spliced session.

For all the media sessions, the first frame must be an I-frame, not B- or P-frame. This is because only I-frame is the basic part for reference. In the present invention, the request of the new media session starts at the middle of a byte. Therefore, when a first frame is not an I-frame, the user will see a damaged image at the instant of triggering migration. According to the present invention, session splicing module 1205 may further include a sync frame search mechanism to ensure that the first frame sent to the media player is a sync frame, such as an I-frame. The sync frame search mechanism may vary according to the metadata format.

For metadata-spreading format, because the metadata spreads all over the entire file, the sync frame search mechanism will block the entering media data until the first sync frame appears. For metadata-gathering format, the metadata block is extracted before a new session is established, therefore, the sync frame search mechanism will search the location in the STSS metadata box for the first sync frame closest to the interrupted point and use the location of the first sync frame as the new starting point.

Therefore, for the above two metadata formats, the sync frame search mechanism may ensure the first frame transmitted to the media player is a sync frame.

The exemplary embodiments of the present invention are all implemented on Linux platform, including handoff from wired network to wireless network, handoff from wireless network to wireless network, handoff from wireless network to wired network, and session migration. From the experiment results including the overhead of host preparation state for handoff, the session splicing state for session migration, the mobile host state for message notification, the state of session splicing with metadata-spreading format for message notification, the metadata reconstruction of metadata-gathering format, and so on, shows that the application of multimedia session splicing on communication networks is feasible.

In summary, the present invention provides an apparatus and method for splicing multimedia session on communication networks. It uses a session splicing technique to splice multimedia stream to persist the ongoing sessions during inter-interface/inter-network handoff or session migration to different devices. The session splicing technique is applicable to the user space and the rectification may be performed at the client. No additional deployment of network infrastructure is required and is compatible with all types of internet communication protocols.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for splicing a multimedia stream session on communication networks, comprising:
   a handoff manager for monitoring whether a mobile host is roaming to other subnets or not, and acquiring a new IP address and issuing a first control signal when a handoff event is triggered during an ongoing session;
   a session migration manager for monitoring whether a media client triggers a migration action during an ongoing session, and sending a state message to a target host for performing session migration, enabling a media player, and issuing a second control signal when a migration action event is triggered; and
   a session splicing module for respectively receiving said first and second control signals, and performing a corresponding session splicing for each control signal to keep said ongoing session continuous for said mobile host or said media client;
   wherein said session splicing module implements a metadata reconstruction mechanism for extracting metadata and reconstructing the extracted metadata to support session splicing of a non-linear multimedia stream session transmitted with metadata-gathering format in addition to session splicing of a linear multimedia stream session transmitted with metadata-spreading format.

2. The apparatus as claimed in claim 1, said apparatus is arranged on a host of a media client in a communication network environment, and said communication network environment has a plurality of subnets and a plurality of mobile devices thereon.

3. The apparatus as claimed in claim 1, wherein said new IP address is acquired from a dynamic host configuration protocol server.

4. The apparatus as claimed in claim 1, wherein said session migration manager extracts a universal resource identifier from said state message and provides to a media player on said mobile host or said media client.

5. The apparatus as claimed in claim 1, wherein when said session splicing module receives said first control signal, said corresponding session splicing is to perform inter-interface or inter-network session splicing in handoff.

6. The apparatus as claimed in claim 1, wherein when said session splicing module receives said second control signal, said corresponding session splicing is to perform session migration to a different device.

7. The apparatus as claimed in claim 6, wherein said corresponding session splicing corresponds to a state machine for controlling and checking a session state of said state machine.

8. The apparatus as claimed in claim 7, wherein said state machine further includes states of session status transfer, metadata-gathering, getting metadata, getting media stream from a media server, modifying metadata/sync frame, getting media stream from said media server, ensuring sync frame and splicing session.

9. The apparatus as claimed in claim 8, wherein said session splicing module further includes a sync frame search mechanism to ensure that a first frame transmitted to a media player is a sync frame.

10. A method for splicing a multimedia stream session on communications networks, comprising:
    monitoring, by a handoff manager, whether a mobile host is roaming to other subnets or a media client that triggers a migration action during an ongoing session;
    acquiring a new IP address when a handoff event is triggered;
    sending, by a session migration manager, a state message to a target host for performing session migration and enabling a media player when a session migration event is triggered; and
    performing, by a session splicing module, a corresponding session splicing for said handoff event or said session migration event to keep said ongoing session continuous for said mobile host or said media client;
    wherein a metadata reconstruction mechanism is implemented by said session splicing module in said corresponding session splicing for extracting metadata and reconstructing the extracted metadata to support session splicing of a non-linear multimedia stream session transmitted with metadata-gathering format in addition to session splicing of a linear multimedia stream session transmitted with metadata-spreading format.

11. The method as claimed in claim 10, wherein said corresponding session splicing further includes:
    terminating an old session between said media player on said mobile host at an old address and a streaming server, and transmitting an original IP address of said mobile host to said streaming server;
    establishing a new session between said mobile host and said streaming server, a splicing point being selected as starting at a next byte following received bytes, and said original IP address being translated to a valid new IP address; and
    splicing a new data channel to an old data channel by using a session splicing process.

12. The method as claimed in claim 11, wherein through said session splicing process, said streaming server refers to said new session and said new IP address to continuously transmit media data to said mobile host, said mobile host translates said new IP address into said original IP address and transmits received media data to said media player already switched to a new address.

13. The method as claimed in claim 10, wherein said corresponding session splicing further includes:
    extracting state information from said state message;
    making said media player play available media resource at an assigned URI from a beginning point; and
    establishing a new session so that transmitted data starting at an interrupted point; and
    splicing an old session and said new session.

14. The method as claimed in claim 13, wherein when media metadata used by transmission protocol is of metadata-spreading format, said corresponding session splicing further includes:
    translating a starting point of a range field requested by transmission protocol into said interrupted point, and then transmitting said interrupted point to a streaming server; and rectifying contents-range and content-length of a transmission protocol response using said streaming server, and transmitting said transmission protocol response to said target host, said target host using session splicing to translate said range field into said starting point and responding to said media player on said target host.

15. The method as claimed in claim 13, wherein when media metadata used by transmission protocol is of metadata-gathering format, said corresponding session splicing further includes:
   extracting metadata from all migrated media and transmitting the extracted metadata to said target host;
   reconstructing the extracted metadata based on said interrupted point;
   replacing transmitted metadata with the reconstructed metadata, and then terminating said old session;
   establishing said new session between said target host and said streaming server, and issuing a request for media data with said interrupted point on said target host as an offset value to said streaming server; and
   splicing said old session and said new session between said media player and said streaming server.

16. The method as claimed in claim 15, wherein said reconstructed extracted metadata is to start with an interrupted sample, check entire media data and re-map to fill a plurality of metadata boxes with new values.

17. The method as claimed in claim 16, wherein said media data comprises at least a video track or audio track, each said video track or audio track further comprises a plurality of samples, and continuous samples belonging to a same track are defined as a chunk.

18. The method as claimed in claim 17, wherein said plurality of metadata boxes contains values of sample size per sample, chunk offset to each chunk, samples per chunk, sample entry for each sync sample, decoding time to each sample and composition time to each sample.

19. The method as claimed in claim 10, wherein when said handoff event is triggered, corresponding session splicing is to perform inter-interface/inter-network handoff session splicing.

20. The method as claimed in claim 10, wherein when said session migration event is triggered, said corresponding session splicing is to perform session migration to a different device.

21. The method as claimed in claim 15, wherein said target host fetches original media metadata from said mobile host or said streaming server.

\* \* \* \* \*